United States Patent
Zhang et al.

(10) Patent No.: US 10,496,768 B2
(45) Date of Patent: Dec. 3, 2019

(54) SIMULATING A PRODUCTION ENVIRONMENT USING DISTRIBUTED COMPUTING TECHNOLOGIES

(71) Applicant: PAYPAL, INC., San Jose, CA (US)

(72) Inventors: Pengshan Zhang, Shanghai (CN); Jun Zhang, Pleasanton, CA (US)

(73) Assignee: PAYPAL, INC., San Jose, CA (US)

( * ) Notice: Subject to any disclaimer, the term of this patent is extended or adjusted under 35 U.S.C. 154(b) by 427 days.

(21) Appl. No.: 15/254,601

(22) Filed: Sep. 1, 2016

(65) Prior Publication Data

US 2018/0060460 A1 Mar. 1, 2018

(51) Int. Cl.
| | | |
|---|---|---|
| G06F 9/44 | (2018.01) | |
| G06F 13/10 | (2006.01) | |
| G06F 13/12 | (2006.01) | |
| G06F 17/50 | (2006.01) | |
| H04L 12/26 | (2006.01) | |
| G06F 11/34 | (2006.01) | |
| G06F 11/30 | (2006.01) | |

(52) U.S. Cl.
CPC ...... *G06F 17/5009* (2013.01); *G06F 11/3006* (2013.01); *G06F 11/3414* (2013.01); *H04L 43/50* (2013.01); *G06F 2217/04* (2013.01)

(58) Field of Classification Search
CPC .................................................. G06F 17/5009
USPC ......................................................... 703/21
See application file for complete search history.

(56) References Cited

U.S. PATENT DOCUMENTS

| | | | |
|---|---|---|---|
| 2009/0300423 A1* | 12/2009 | Ferris .................... | G06F 11/36 714/38.1 |
| 2011/0302151 A1 | 12/2011 | Abadi et al. | |
| 2012/0054551 A1* | 3/2012 | Gao .................... | G06F 11/3664 714/38.1 |
| 2013/0254196 A1 | 9/2013 | Babu et al. | |
| 2013/0298111 A1 | 11/2013 | Koseki et al. | |
| 2013/0326538 A1 | 12/2013 | Gupta et al. | |
| 2014/0280032 A1 | 9/2014 | Kornacker et al. | |
| 2014/0282605 A1* | 9/2014 | Jacobson ............... | G06F 9/461 718/107 |

OTHER PUBLICATIONS

Xavier et al. "A Performance Comparison of Container-based Virtualization Systems for MapReduce Clusters", Feb. 2014.*

(Continued)

*Primary Examiner* — Timothy A Mudrick
(74) *Attorney, Agent, or Firm* — Haynes and Boone

(57) ABSTRACT

Systems and methods for query large database records are disclosed. An example method includes: selecting a user-specified test program for execution; determining one or more testing parameters associated with the user-specified test program; identifying, based on the one or more testing parameters, computing nodes within a distributed computing system; generating, based on the user-specified test program, a first plurality of computing tasks for execution by the computing nodes. The first plurality of computing tasks, when executed, generates a second plurality of computing requests to a server under test. The method also includes distributing execution of the first plurality of computing tasks across the computing nodes; and testing the server under test by causing the first plurality of computing tasks to be executed by the computing nodes.

20 Claims, 8 Drawing Sheets

(56) References Cited

OTHER PUBLICATIONS

Kazuhiro Saito et al., "Efficient Query Processing for Data Sharing Multi-Database System," IPSJ SIG Technical Report, vol. 2013—DB, No. 6, Nov. 19, 2013, pp. 1-8.

Yoshifumi Fukumoto et al., "Optimization for Multiple Analysis Jobs on Mapreduce," Proceedings of the 3rd Forum on Data Engineering and Information Management, Aug. 4, 2011.

Zhuoyao Zhang et al., "Optimizing Completion Time and Resource Provisioning of Pig Programs," 2012 12th IEEE / ACM International Symposium on Cluster, Cloud and Grid Computing (CCGRID), May 16, 2012.

* cited by examiner

US 10,496,768 B2

SIMULATING A PRODUCTION ENVIRONMENT USING DISTRIBUTED COMPUTING TECHNOLOGIES

TECHNICAL FIELD

The present disclosure relates generally to data simulation, and in particular, to simulating a production environment using distributed computing technologies.

BACKGROUND

When testing whether a server-side application can meet certain performance requirements in order to properly function in a production environment (e.g., capable of handling 2,000,000 user requests at the same time), it may be important to generate (1) a large number of user requests and (2) access an equally large amount of user data consistent with those typically seen or used in the production environment. If a testing environment is not similar enough to a production environment, any testing conducted therein may not be of high enough value, because the test results may not be representative of what may happen in the production environment.

Simply duplicating the production environment to provide a testing environment may not be practical or even possible sometimes. A production environment is often equipped with numerous resources, e.g., thousands of data servers connected with high-speed computer networks. A testing environment, in contrast, is often resource-lacking, e.g., including a single testing data server with a 10 Mbps Internet connection.

There is therefore a need for a device, system, and method, which simulate a production environment with limited resource by using distributed computing technologies.

Figure 1:
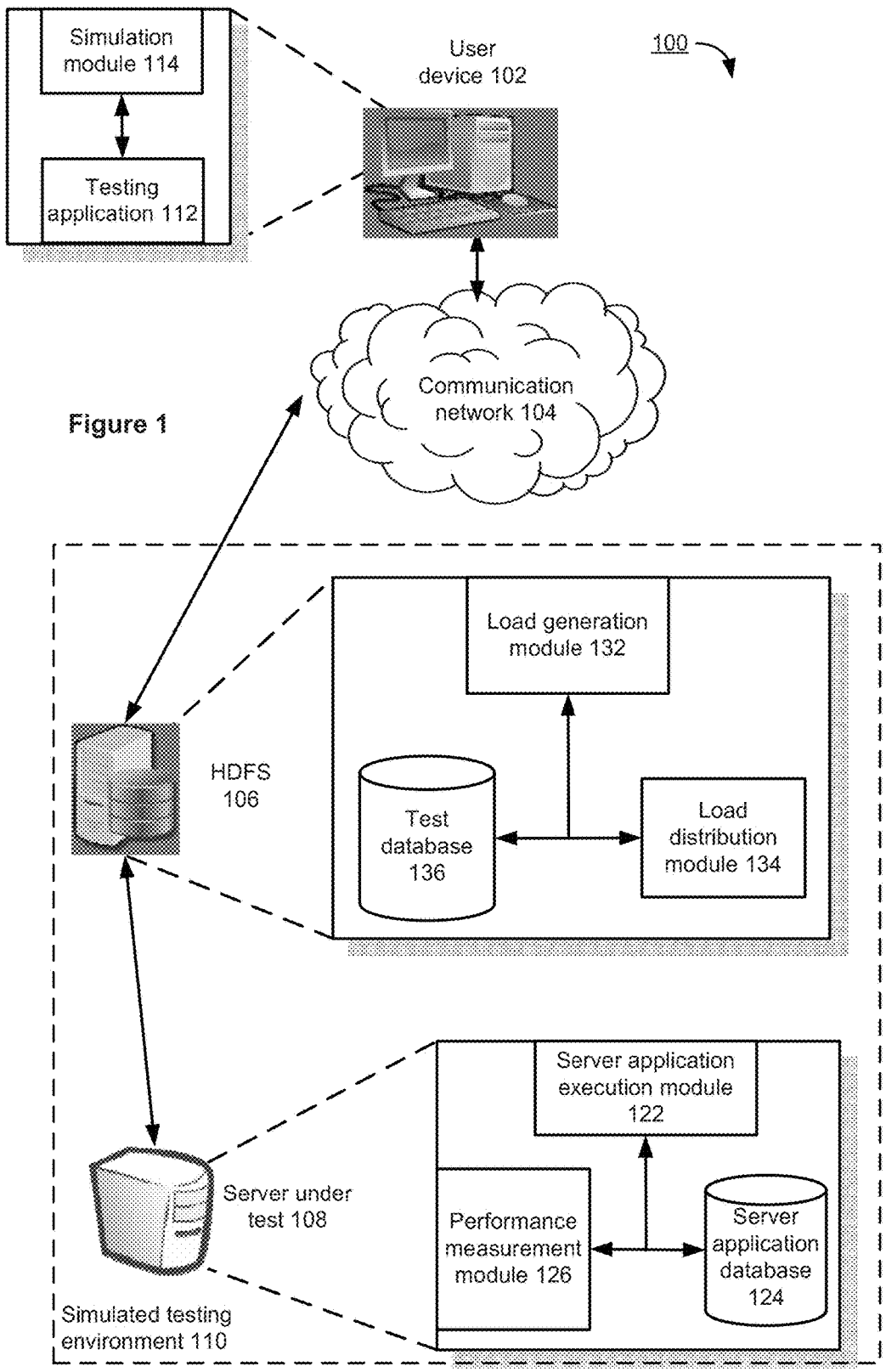
FIG. 1 is a schematic view illustrating an embodiment of a system for simulating a production environment using distributed computing technologies.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides systems and methods for simulating a production environment with limited resources by using a distributed file system, for example, a Hadoop distributed file system (HDFS).

A Hadoop system may provide high computing power and storage capacity by using large numbers of computing nodes. An HDFS is a distributed, scalable, and portable file system written in Java for the Hadoop framework. A Hadoop cluster may include a single name node that manages a cluster of data nodes. Redundancy on the name node may also be provided due to its criticality. Each data node serves up blocks of data over the network using a block protocol specific to HDFS.

To generate a predefined amount of testing load that cannot be generated by a single computer, hundreds or even thousands of instances of a same test program or different test programs may be executed on a large number of computing nodes (e.g., 1,000 or 10,000 computing nodes). The computing nodes can simulate user behaviors typically seen in a production environment, e.g., requesting a server to begin a large number of computing tasks simultaneously, creating a particular pattern of user requests, and accessing server data in a particular large-scale manner.

In these ways, a testing environment can simulate data processing capacities typically provided by a production environment with potentially only a fraction of computing and network resources required to enable the production environment. Besides generating the required testing load, other Hadoop features may facilitate the simulation of a production environment. For example, an auto-restart feature available in an HDFS may be used to programmatically detect whether a server-side application has become unresponsive and can replace the unresponsive application with a new application or starting a new instance of the server-side application without terminating the current instance of the unresponsive application. A test suite may also be automatically restarted (with or without a fatal error) and test results automatically logged by invoking existing Hadoop APIs without requiring additional programming efforts.

The systems and methods described in the present disclosure can provide a variety of technical advantages. First, more comprehensive test coverage can be provided by generating various amounts of testing loads. Second, testing programs can be executed and test results obtained in a batch processing fashion with high data throughput. Third, an HDFS can provide optimized access to and therefore enable testing with large unstructured data records, such as for testing operational analytics. Fourth, the architecture of an HDFS is transparent to the user planning the test, and existing test programs do not need to be modified when a new computing node is added or an existing computing node is modified.

Additional details of implementations are now described in relation to the Figures.

FIG. 1 is a schematic view illustrating an embodiment of a system 100 for simulating a production environment using distributed computing technologies. The system 100 may comprise or implement a plurality of servers and/or software components that operate to perform various technologies provided in the present disclosure.

As illustrated in FIG. 1, the system 100 may include a user device 102, an HDFS 106, and a server under test (sometime also referred to as a testing server) 108. In the present disclosure, a user device 102 may be a mobile device, a smartphone, a laptop computer, a notebook computer, a mobile computer, a wearable computing device, or a desktop computer.

In one embodiment, the user device 102 generates test suites based on one or more testing parameters provided by a user. A test suite may include a collection of executable computer programs which, when executed, create test cases/scenarios that can determine whether a software application behaves in an expected way. For example, a test suite may include (1) the name of a target database, (2) a number (e.g., twenty) of Structured Query Language (SQL) queries, each of which includes a number (e.g., five to ten) of user-provided search keywords, and (3) a number or quantity (e.g., twenty sets) of expected search results, each of which identifies one or more search results the corresponding SQL query is expected return upon a successful execution.

A test suite may also include system configuration and performance expectation metrics, which indicate the configuration of a computing system on which a test case is to be executed (e.g., a LINUX running equipped with at least 1 GB RAM) and performance metric (e.g., an expected response time, such as two minutes, within which the execution of the twenty SQL queries described above is expected to complete and their results fully returned). A test suite may further include prerequisite states or steps for an execution of a particular test suite, e.g., which other test suites need to be executed first before executing the current test suite.

In one embodiment, the user device 102 includes a testing application 112 and a simulation module 114. The testing application 112 includes a software application that enables a user to configure test suites and execute the configured test suites either locally or remotely, e.g., on the user device 102 or on the HDFS 106, respectively. For example, a user may add a new test case to a test suite and remove or otherwise modify an existing test case included in a test suite; a user may also specify test configuration parameters, for example, specifying a minimum number of instances of a test case (e.g., 20,000 user login requests with different user names and passwords) to be executed concurrently against a particular server application whose performance and accuracy is being tested (e.g., verified and measured).

The simulation module 114, based on user-provided testing requirements, determines the configuration of a testing environment within which a test suite is to be executed. If a test suite included a predefined number of search queries, the testing parameters may specify the size of a target database to be searched, the time frame within which matching search results are expected to be returned, and the minimum number of search queries to be executed simultaneously against the target database (e.g., to create a predefined amount of computing load on the target database).

In one embodiment, the communication network 104 interconnects a user device 102, a SQL system 106, and a HDFS 108. In some implementations, the communication network 104 optionally includes the Internet, one or more local area networks (LANs), one or more wide area networks (WANs), other types of networks, or a combination of such networks.

In one embodiment, the HDFS 106 determines how a test suite is to be executed (e.g., as part of a batch testing job or as an ad hoc testing job) and executes the test suite using the computing resource available in the HDFS 106 accordingly.

For example, if a test suite includes 20,000 SQL search queries to be executed against a search engine running on the server under test 108, the HDFS 106 may distribute the 20,000 SQL search queries evenly among four computing nodes included in the HDFS 108 and arrange the 20,000 SQL search queries for execution by the four computing nodes simultaneously, to test how the server under test 108 may perform when handling 20,000 queries at the same time. If a test performance indicator indicates that the search engine is expected to returns all search results within 200 milliseconds, while the search engine returns testing search results within 180 milliseconds, the HDFS 106 may determine that the search engine meets the load performance requirement.

In one embodiment, the HDFS 106 includes a load generation module 132, a load distribution module 134, and a test database 136. The load generation module 132 may generate computing requests that, when executed, requests that an application running on the server under test 108 perform certain tasks. For example, a test program for requesting a user's transaction history may include (1) a first computing request for the server under test 108 to compare a user provided user name-password pair with a previously accepted user name-password pair stored on the server application database 124 (the first server task); and (2) a second computing request for the server to return, after a successful user authentication, credit card transactions the user conducted within the last ten years (the second server task). In this case, the load generation module 132 may create 200,000 instances of the user-specified test program each directed at a different user, thereby generating 400,000 individual computing requests directed at the server under test 108.

In some implementations, however, an individual computer is incapable of executing more than a predefined number of test programs (e.g., 100,000 instances of a user authentication program) or generating the corresponding number of computing requests (e.g., 200,000 computing tasks), and as a result, the corresponding number of computing requests may need to be generated by multiple computing devices. In the present disclosure, the total amount of computing requests that needs to be generated in order to verify whether a server under test can meet a given test requirement is referred to as a required computing load.

The load distribution module 134 may determine a total number of computing nodes needed in order to generate a given computing load and distribute (or redistribute) the computing load among the determined nodes, e.g., evenly or based on a predefined distribution schedule when generating the load. For example, to execute 200,000 instances of the test program for requesting a user's transaction history simultaneously against the server under test 108, the load distribution module 134 may select six computing nodes and assign 10,000 computing requests to the first node and 2,000 computing requests to each of the remaining five nodes.

The test database 136 may store one or more test suites and the corresponding test data for execution, e.g., the test suite for creating 200,000 user authentication requests as well as 200,000 user name-password pairs. In some embodiments, the test database 136 is implemented distributedly across multiple computing nodes in the HDFS. This implementation can be technically advantageous. First, a Hadoop system or the like can store a large number of data records, the size of each of which is itself large, e.g., 64 MB; testing involving access (e.g., reading or writing) large data records can therefore be optimized on a Hadoop system. Second, a Hadoop system or the like is optimize for batching data processing, which in turn can create a large amount computing load (e.g., data access requests) that may be desired for conducting certain performance testing.

In one embodiment, the server under test 108 includes a server that hosts one or more server-side applications on which instances of a user-specified test program can be executed. For example, in the server under test 108 may host the server-side of an online shopping application that can request a user to authenticate herself and provide records of all past transactions upon a successful user authentication. The server under test 108 may include a server application execution module 122, a server application database 124, and a performance measurement module 126. The HDFS 106 and the server under test 108 may be collectively referred to as the simulated testing environment 110.

The server application execution module 122 may execute and maintain one or more server-side applications for responding to computing requests generated by testing programs running on the HDFS 106.

The server application database 124 may store one or more server-side applications for execution on the server under test 108, e.g., a web-based online shopping application, a fund transfer application, and a payment application, as well as the corresponding data that the server-side application may process, e.g., order histories, available funding instruments, and applicable payment account, respectively.

The performance measurement module 126 may monitor and measure the performance (e.g., average response time per computing request, total number of failures, longest unresponsive time periods, and total execution time) of a server-side application for responding to computing requests generated by client applications (or instances thereof) running on the computing nodes within the HDFS 106.

Using distributed computing technologies to simulate a production environment can provide the following technical advantageous for the following reasons.

Some server-side applications may be "big data" applications, e.g., applications that require processing of large amounts of data within a predefined timeframe, which cannot be processed using traditional computing techniques (e.g., running a single testing program on a single computing server). Testing big data applications involves more verification of its data processing than testing each individual features of a software application. Therefore, performance and functional testing may be the key requirement for testing big data applications.

First, the system 100 can provide testing with both structured data and unstructured data; whereas a traditional testing environment assumes that the underlying data is well-structured (e.g., SQL tables) and is often ill-equipped to process unstructured data (e.g., large text chunks, audio files, and movie clips), which are not optimized for query and access by SQL queries.

Second, the system 100 can provide computing loads that are required for large scale performance testing and scalability with the addition of new computing nodes. Little reconfiguration effort is needed when a new computing node is added.

Figure 2A:
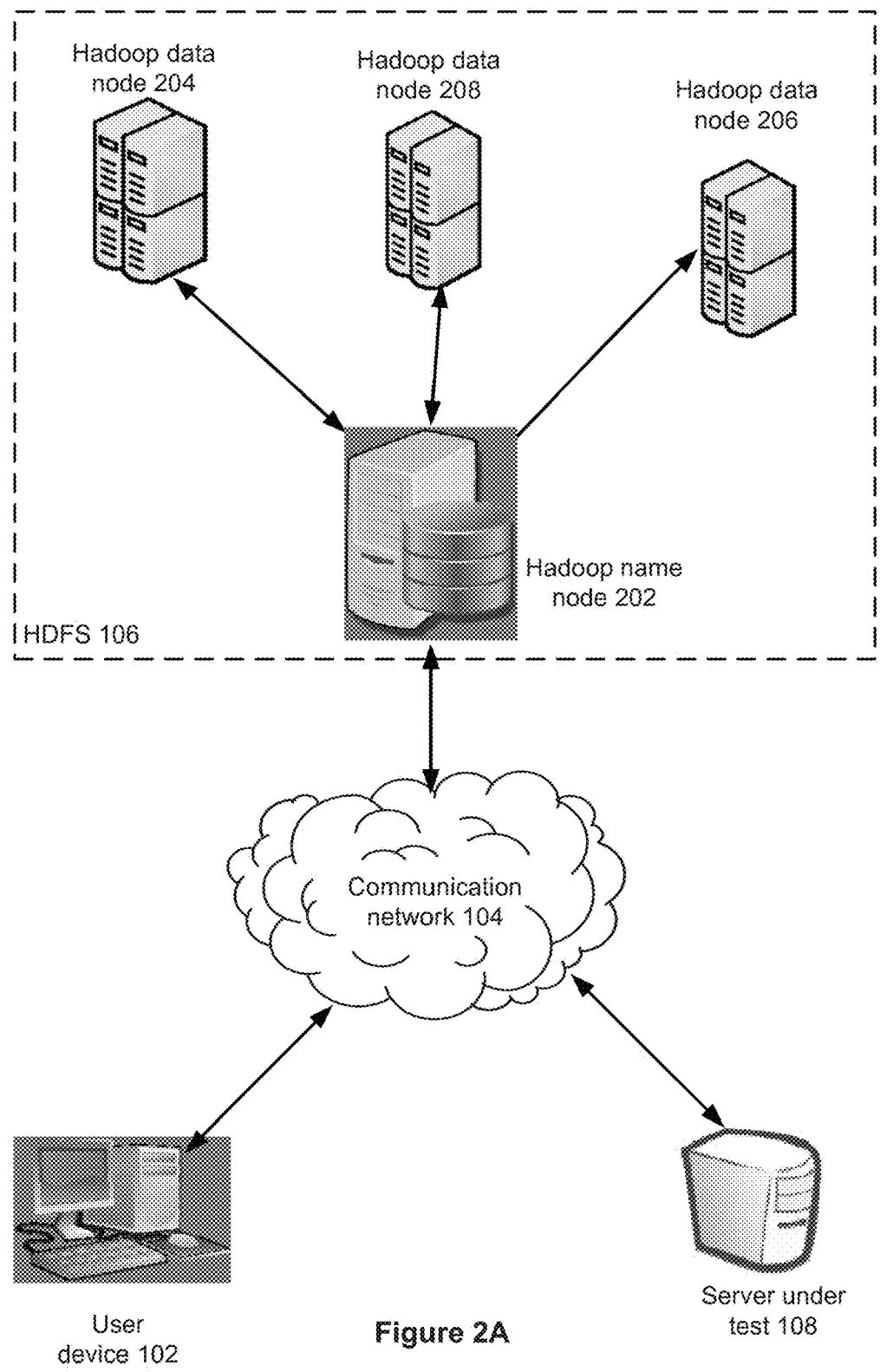
FIG. 2A is a schematic view illustrating an embodiment of a second system for simulating a production environment using distributed computing technologies.

FIG. 2A is a schematic view illustrating an embodiment of a second system 200 for simulating a production environment using distributed computing technologies. The system 200 may comprise or implement a plurality of servers and/or software components that operate to perform various technologies provided in the present disclosure.

As shown in FIG. 2A, the system 200 may include a computer device 102, an HDFS, and a server under test 108. The HDFS 108 may include a Hadoop distributed computing and file storage system, which includes a Hadoop name node 202 that manages a predefined number of Hadoop data nodes, e.g., the data nodes 204, 206, and 208. The Hadoop name node 202 and its associated data nodes 204, 206, and 208 may be collectively referred to as a Hadoop data distributing computing system, e.g., the HDFS 106.

In some implementations, when executing a test program against a server-side application running on the server under test 108, the user device 102 does not execute the test program locally, especially when the test program involves a load test on a computing server (e.g., measuring how a server-side application responds to a large amount of computing requests). This may be because the user device 102 is not equipped with enough computing resources (e.g., CPU power, memory capacity, or hard drive capacity) to create a required amount of computing load on a server-side application running on the server under test 108. For example, a traditional desktop computer may not be capable of generating 200,000 instances of a user login request and execute these 200,000 requests simultaneously against a user authentication application running on a testing server.

In some implementations, therefore, the computing device 102 requests that the HDFS 106 generates computing tasks corresponding to a test program and executes the generated computing tasks across multiple computing nodes. For example, the name node 202 may generate of the 200,000 instances of the user login request and distribute the execution of these 200,000 instances among the data nodes 206. For example, the node 202 may assign 70,000 instances to the node 204, another 70,000 instances to the node 206, and the remaining 60,000 instances to the node 208.

The HDFS 108 may be a Java-based computing system designed to span large clusters of data servers. The HDFS 108 may provide computing and storage scalability by adding new computing nodes and may automatically redistribute existing computing loads onto the new computing nodes to achieve not only data balancing, but also large scale computing load generation. A large number of computing tasks, e.g., search queries, data retrieval requests, data read/write requests, may be generated and executed distributedly among multiple applicable computing nodes and performed in parallel. By distributing storage and computing load across a large number of computing nodes, the combined computing load can grow linearly with testing demand while remaining economical at every amount of computing resource.

Using the HDFS 108 to store a large amount of data records, each of which is also itself large in size, and to generate a huge number of computing requests can provide the following advantages.

First, the name node 202 may take into account a data node's physical or network location when allocating computing requests to the data node. For example, the HDFS may choose the data node 204, which is located in a same local area network as the computing device 102 to execute a greater number of instances of a same or different test programs, to reduce transmission overhead (e.g., when the performance of a computer network connecting the data node 206 and the computing device 102 is below an acceptable level or has suffered an outage) and therefore more accurately measure the performance of the server-side application responding to the test programs.

Second, the name node 202 may dynamically monitor and diagnose the health of the data nodes 204-208 and rebalance the generation and execution of computing requests among these nodes.

Third, the name node 202 may restart or replace, e.g., through the fault tolerance functionality provided by a Hadoop system, computing tasks that have been deemed as unresponsive and replace them with new computing tasks, to maintain the total amount of computing load that may be required to properly test a server-side application. For example, if the minimum number of login requests that needs to be run concurrently against a server-side user authentication application is 200,000, then when 2,000 requests are not available due to the computing node on which these requests are executed being unresponsive, the name node 202 may start an additional 2,000 requests on a different computing node.

Fourth, the HDFS 108 can be automated and thus require minimal user invention, e.g., when executing batch data testing jobs that includes a large number of individual test programs, allowing a single user to monitor and control a cluster of hundreds or even thousands of data nodes.

Fifth, because the computing requests generated for testing purposes are generated and executed on the data nodes where the required test data records reside (e.g., are stored), network I/O needed to prepare execute the test programs and performance degradation caused by overhead associated with a testing computer (e.g., a data node) may be reduced.

Figure 2B:
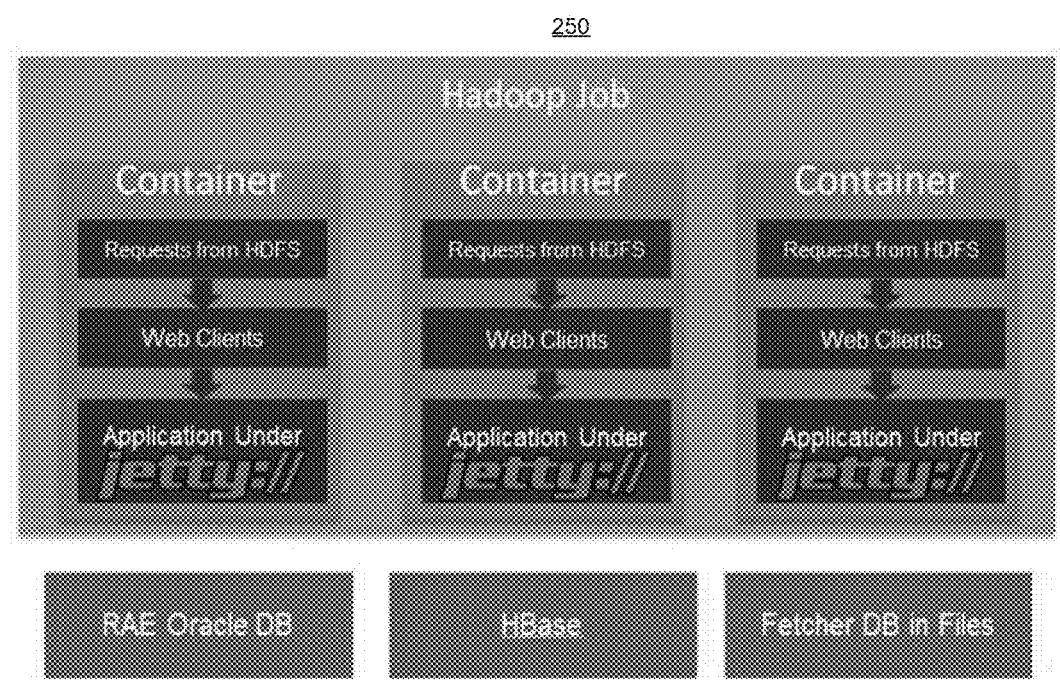
FIG. 2B is a schematic view illustrating an embodiment of a third system for simulating a production environment using distributed computing technologies.

FIG. 2B is a schematic view illustrating an embodiment of a third system 250 for simulating a production environment using distributed computing technologies.

The example system 250 shown in FIG. 2B leverages a Hadoop system to manage system resources, e.g., scheduling hundreds and thousands of testing programs in one Hadoop batch execution job.

As shown in FIG. 2B, each container is used to launch both JavaEE application and http web clients. Http web clients may read requests from the HDFS 250 and send requests to application server inside the same container. All application depending on same ORACLE or HBASE databases, maintaining the consistency with the configurations of a production environment.

Figure 3A:
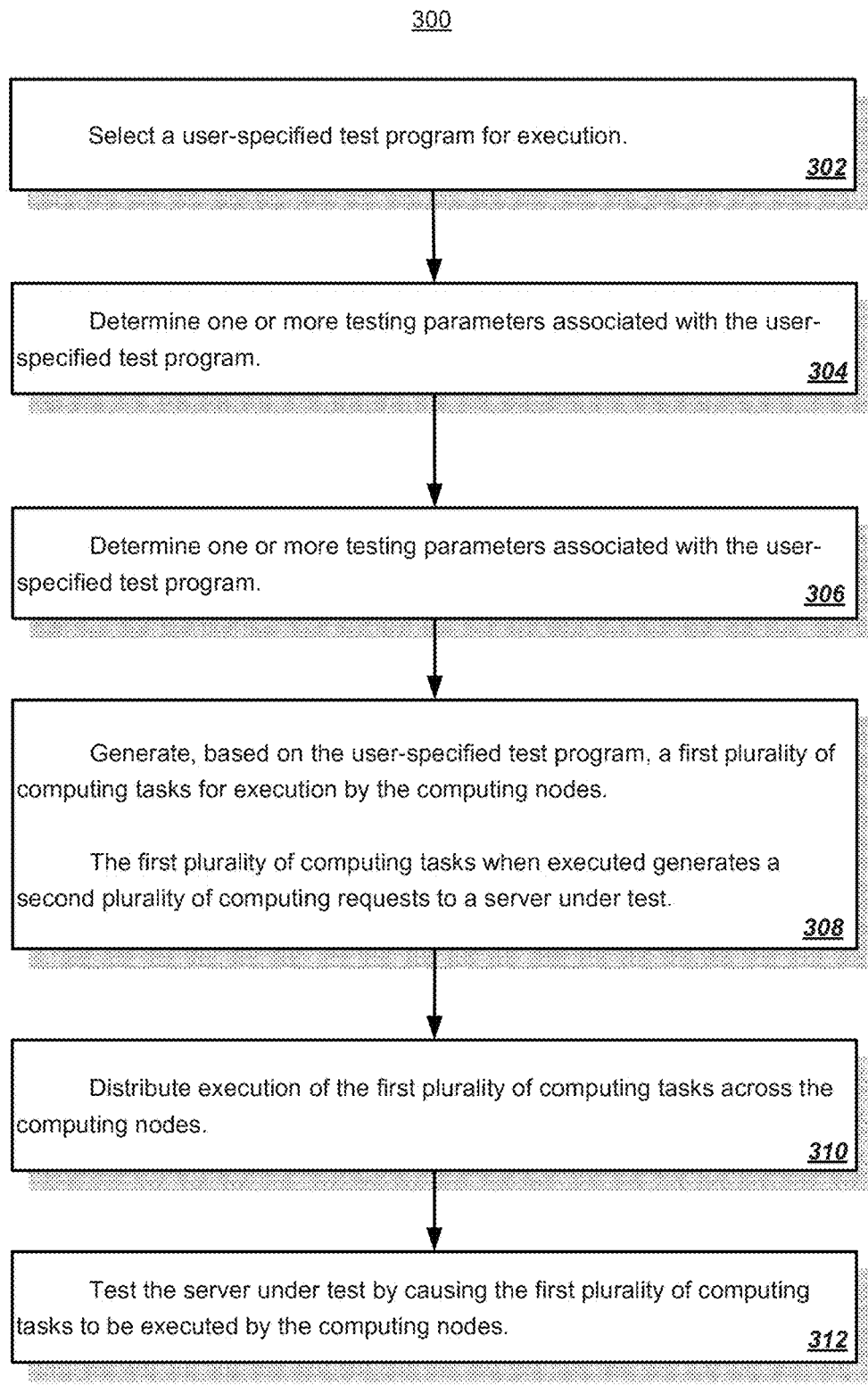
FIG. 3A is a flow chart illustrating an embodiment of a method for simulating a production environment using distributed computing technologies.

FIG. 3A is a flow chart illustrating an embodiment of a method for simulating a production environment using distributed computing technologies. The HDFS 106, for example, when programmed in accordance with the technologies described in the present disclosure, can perform a method 300.

As explained above, in some situations, an HDFS may be used to simulate the execution of test programs in a production environment. For example, an HDFS can produce a large amount of testing load by requesting a large number of computing nodes to each generate a predefined portion (e.g., 10%, 20%, and 30%) of a required testing load. For example, to generate 200,000 computing requests simultaneously, an HDFS may request one hundred computing nodes to each generate 2,000 computing requests.

The method 300 may begin a production simulation process by determining testing parameters assigned to a test program by a user. For example, after a user selects a test suite for execution (e.g., in a batch execution fashion or a real-time execution fashion), the method 300 may determine, based on the testing parameters, that the test suite when executed can simultaneously generate 1,000,000,000 database queries against two database tables within the same SQL database located on a SQL data server named "beta_DB_test." In some implementations, therefore, the method 300 may include selecting (302) a user-specified test program for execution and determining (304) one or more testing parameters associated with the user-specified test program.

Based on these determinations, an HDFS may, e.g., mathematically or logistically, break down the required test load into smaller computing requests and request multiple computing nodes within a distributed computing system to complete these computing requests. The method 300 may therefore include identifying (306), based on the one or more testing parameters, computing nodes within a distributed computing system. After receiving the user-specified parameters, for example, the Hadoop name node may request all available data nodes under its management to provide their current and future processing bandwidth, as well as any additional feedback as to whether they can process any of the 1,000,000,000 SQL queries and, if so, how many queries each node may be able to process. The name node, based on the bandwidth information provided by the data nodes, may then determine the total number of computing nodes needed for generating the required 1,000,000,000 database queries.

To generate 1,000,000,000 SQL queries against a SQL server database having one hundred tables, for example, the name node may request and receive feedback from 200 Hadoop data nodes indicating that all of these nodes will become available, such as in the next ten minutes, to execute up to 10,000 database queries per node. The method 300 may then distribute the test load among these 200 data nodes evenly (e.g., 5,000 queries per node) or select ten nodes from these twenty nodes and request that each of these ten nodes to execute 10,000 queries simultaneously in the next five minutes. When the selected computing nodes generate their assigned work load, the required testing load is achieved.

A required amount of testing loading can sometimes be broken further down into even smaller load units, such as computing tasks, for load generating and distribution purposes. A single computing request may include multiple computing tasks that need to be individually completed by a server. In some implementations, computing tasks are the smallest load units and thus cannot be further broken down into smaller load units for load calculation and distribution purposes. For example, a computing request for executing a user search query against a database may include three computing tasks, e.g., (1) locating the data tables referred to by the search query where matching records reside, (2) querying against the located tables, and (3) combining (or joining) the matching query records as search results. In some implementations, the method 300 may therefore include generating (308), based on the user-specified test program, a first plurality of computing tasks for execution by the computing nodes and distributing (310) execution of the first plurality of computing tasks across the computing nodes.

Distributing computing loads based on more granular measurements, such as computing tasks rather than computing requests, can be technically advantageous. Because each computing task may create a different load impact on a testing server, using computing tasks as individual units to simulate load generation and calculate load distribution can produce more accurate results. For example, some computing requests (e.g., a search-and-then-update request) can generate greater load impact on a testing server than other requests (e.g., a mere read request); treating these computing requests equally for load generation and distribution purposes can therefore result in imbalanced load distribution.

In addition, the Hadoop name node may be leveraged to manage and control the distribution of test load. This can be technically advantageous, because the Hadoop name node has the existing responsibility of load balancing and management, requesting the Hadoop name node to perform similar duties for the testing simulation purpose can help reduce simulation overhead, which may otherwise arise from requiring additional computing resources to be allocated for performing these tasks. This is especially significant when using a testing environment to simulate a production environment, because, as explained in the present disclosure, the testing environment, unlike a production environment, is usually resource lacking.

After selecting the computing nodes needed for performing a particular simulation, the method 300 may dynamically adjust the simulation by redistributing the testing load to one or more additional computing nodes, for example, as computing resources on those nodes become available, as existing nodes are removed or replaced, or as new nodes are added to the HDFS. To continue with the example above, while executing the 1,000,000,000 search queries, the HDFS may gather, in real time, testing progress information from the Hadoop name node. If, based on the real time testing process, the HDFS determines that the testing load is lower than expected and needs to be increased, the HDFS may request the Hadoop name node to engage more computing nodes in order to provide the expected testing load.

After causing the desired computing load to be distributed (e.g., by delegating the load distribution to the name node), the HDFS executes the user-selected test suite when other predefined conditions are met. In some implementations, therefore, the method 300 includes testing (312) the server under test by causing the first plurality of computing tasks to be executed by the computing nodes. For example, if a user elects to run a test suite as part of a batch testing job that includes more than 2,000 test suites, the HDFS may place the test suite in a batch processing job for overnight execution. As another example, when a user elects to execute a test suite before two other test suites are executed, the method 300 may create conditional programming statements to detect whether the two other test suites have been executed and execute the instant test suite after their executions.

In some implementations, during the generation of a testing load, the Hadoop name node may determine whether a data node is working as expected (e.g., generating its portion of the testing load), and when the data node is not working as expected, take remedial measures.

One remedial measure includes restarting an unresponsive data node. For example, when a data node is unresponsive, the name node may restart the computing load on that node. In one embodiment, the computing requests (when executed) request responses from a first server application; and the method 300 includes detecting, using the name node, that the first server application is unresponsive, and responsive to the detecting, automatically re-starting, using the name node, the first server application. A data node or an application executing thereon is deemed unresponsive, for example, if the data node or the application has not produced the expected testing load within a predefined timeframe (e.g., with 1 minute from the beginning of the test suite execution), if the data node or the application has not provided, to the name node, a confirmation that it has begun generating the expected testing load, if the data node or the application has not provided, to the name node, a confirmation that it has finished generating the expected testing load.

Another remedial measure includes starting a new instance of a testing program on a different computing node. In one embodiment, therefore, the method 300 includes detecting, using the name node, that the first server application provides a response time longer than a predefined response time, and responsive to the detecting, automatically starting, using the name node, a second instance of the first server application. When a data node is unresponsive, the name node may try to suspend or terminate the computing load on that node after starting a new instance of the test program. Alternatively, the name node may start the new instance without attempting to modify the computing load on the unresponsive node, because the unresponsive node may recover and resume generating the test load. In some embodiments, the name node deems the designated testing load fulfilled when one of the two nodes (e.g., the new node and the unresponsive node) completes the testing load generation.

When simulating a production environment using a testing environment, in some embodiments, various existing Hadoop functionalities are leveraged without requiring additional programming efforts. The method 300 may therefore include one or more of the following: 1) terminating an original instance of the first server application and measuring a response time of the second instance of the first server application; 2) continuing an original instance of the first server application and determining a response time of the first server application based on response time of the original instance and response time of the second instance; 3) determining a performance indicator to be measure and generating the first plurality of computing tasks to provide a predefined number of computing requests; 4) causing the first plurality of computing tasks to be executed by the computing nodes in a batch processing fashion by the computing nodes; or 5) that the second plurality of computing requests comprises two or more types of computing tasks.

Figure 3B:
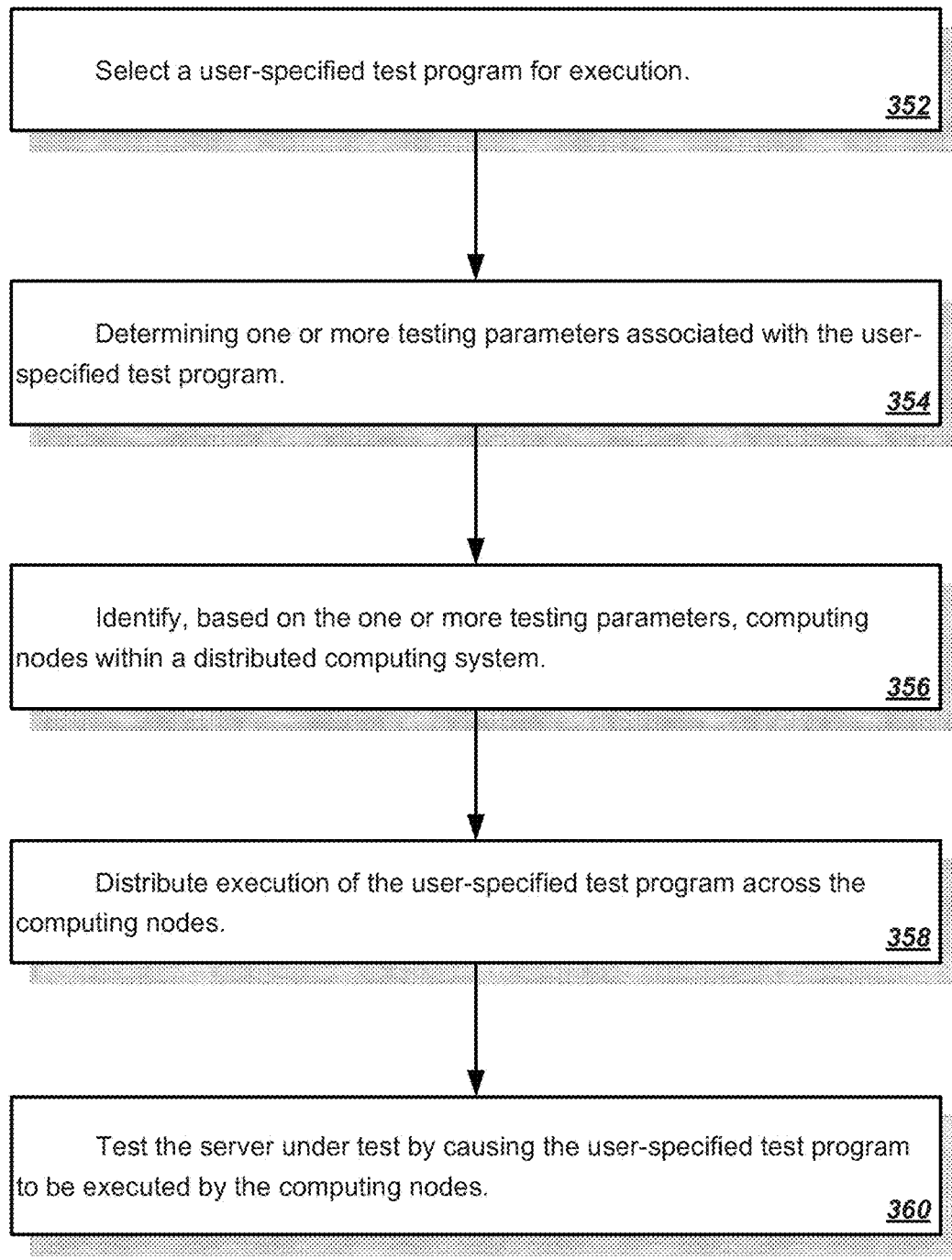
FIG. 3B is a flow chart illustrating an embodiment of a second method for simulating a production environment using distributed computing technologies.

FIG. 3B is a flow chart illustrating an embodiment of a second method 350 for simulating a production environment using distributed computing technologies. The HDFS 106, for example, when programmed in accordance with the technologies described in the present disclosure, can perform the method 350.

In some implementations, test suites are executed as part of a batch execution job in a simulated production environment. For example, a batch execution job may include hundreds or thousands of test suites for an overnight batch execution. An HDFS may execute the batch job by executing the individual testing suites in series (when the testing is conducted against a single testing server) or in parallel (when the testing is independently conducted against multiple testing servers). As part of a batch processing job, the method 350 may include selecting (352) a user-specified test program for execution and determining (354) one or more testing parameters associated with the user-specified test program.

Because each test suite may be executed by a different node, the Hadoop name node may assign or distribute the execution of each test suite on an individual basis, e.g., assigning test suites to different nodes. The method 350 may therefore include identifying (356), based on the one or more testing parameters, computing nodes within a distributed computing system and distributing (358) execution of the user-specified test program across the computing nodes. For example, to reduce testing overhead, the Hadoop name node may assign test suites to data nodes where the necessary test data are stored (or reside) or data nodes that have better network connection with the server under test or with the name node. As another example, the name node may assign test suites A, C, D, and E to the data node A, because these test suites access the same data records (e.g. two different video clips) stored on the data node A; the name node may assign test suites B and F to the data node B, because test suites B and F modify the same data record and test suite F needs to be execute after test suite B completes.

Once all test suites scheduled for testing are distributed, the method 350 may schedule the testing of the server under test by causing (360) the user-specified test program to be executed by the computing nodes, when other conditions are met.

Figure 4:
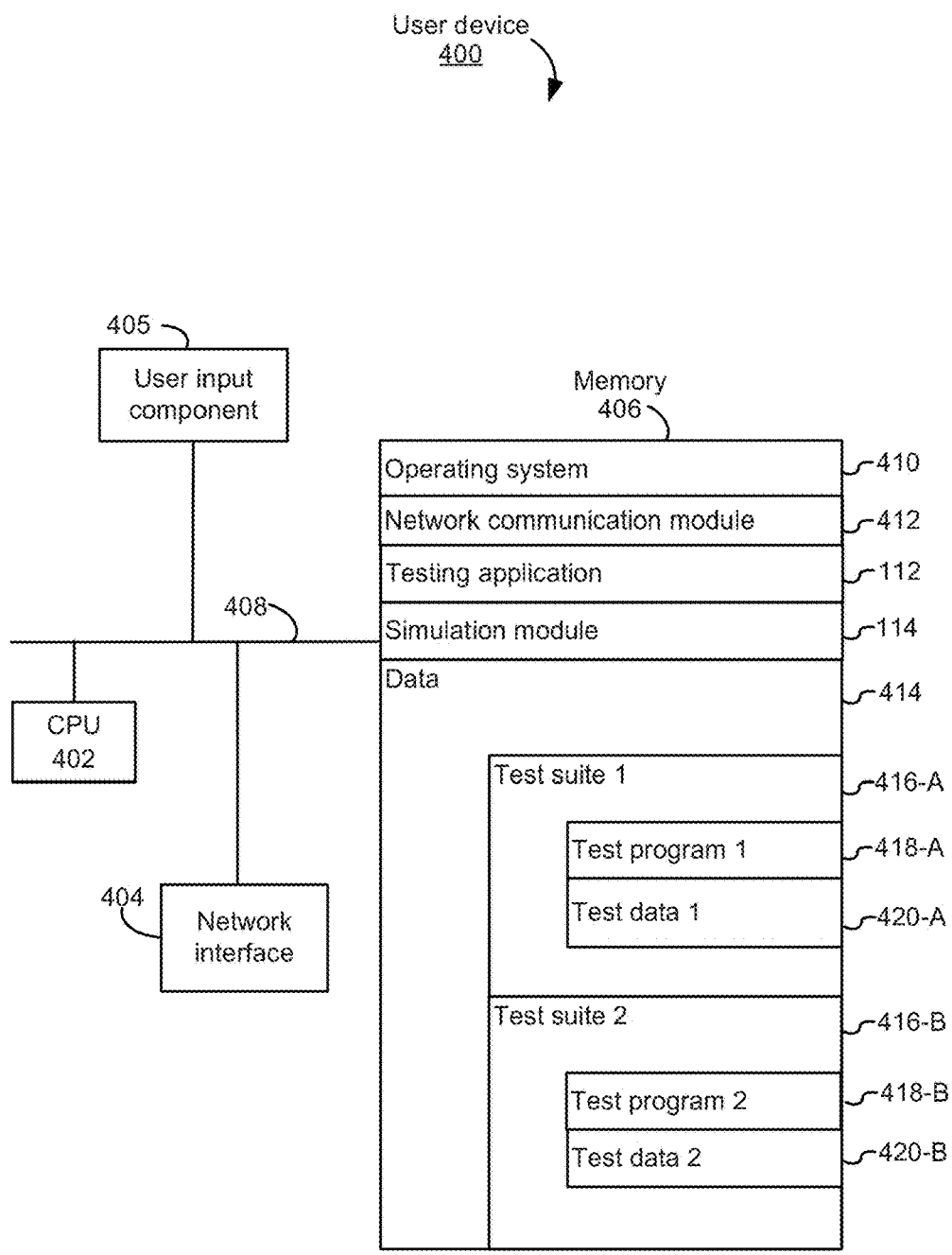
FIG. 4 is a schematic view illustrating an embodiment of a user computing device.

FIG. 4 is a schematic view illustrating an embodiment of a user computing device, which can be the device 102 shown in FIG. 1. The device 400 in some implementations includes one or more processing units CPU(s) 402 (also referred to as hardware processors), one or more network interfaces 404, a memory 406, and one or more communication buses 406 for interconnecting these components. The communication buses 406 optionally include circuitry (sometimes called a chipset) that interconnects and controls communications between system components. The memory 406 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 406 optionally includes one or more storage devices remotely located from the CPU(s) 402. The memory 406, or alternatively the non-volatile memory device(s) within the memory 406, comprises a non-transitory computer readable storage medium. In some implementations, the memory 406 or alternatively the non-transitory computer readable storage medium stores the following programs, modules and data structures, or a subset thereof:
- an operating system 410, which includes procedures for handling various basic system services and for performing hardware dependent tasks;
- a network communication module (or instructions) 412 for connecting the device 400 with other devices (e.g. the HDFS 106 or the server under test 108) via one or more network interfaces 404 (wired or wireless) or via the communication network 104 (FIG. 1);
- a testing application 112 for enables a user to configure and execute testing on computer programs residing or executing on a different computer system (e.g., the server under test 106);
- a simulation module 114 for determining one or more test parameters (or the testing environment, e.g., the total amount of data to be searched, the time frame in which a search result needs to be returned, and the total number of searches to be executed simultaneously against a search engine) with which a testing is to be executed; and
- data 414 stored on the device 400, which may include:
  - one or more test suites (e.g. 416A and 416B), each of which may include a test program (e.g., 418-A or 418-B) and the corresponding test data (e.g., 420-A and 420-B).

The device 400 may also include one or more user input components 405, for example, a keyboard, a mouse, a touchpad, a track pad, and a touch screen, for enabling a user to interact with the device 400.

In some implementations, one or more of the above identified elements are stored in one or more of the previously mentioned memory devices, and correspond to a set of instructions for performing functions described above. The above identified modules or programs (e.g., sets of instructions) need not be implemented as separate software programs, procedures or modules, and thus various subsets of these modules may be combined or otherwise re-arranged in various implementations. In some implementations, the memory 406 optionally stores a subset of the modules and data structures identified above. Furthermore, the memory 406 may store additional modules and data structures not described above.

Figure 5:
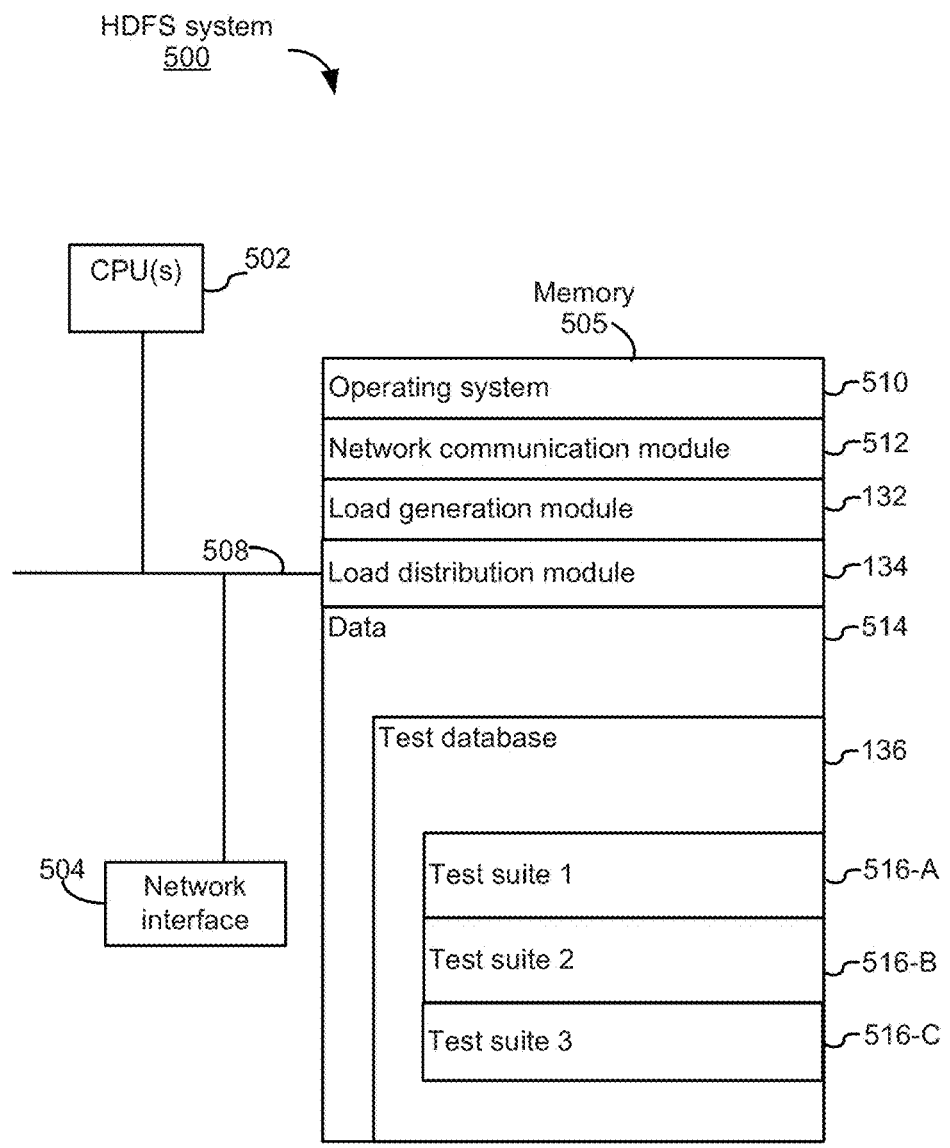
FIG. 5 is a schematic view illustrating an embodiment of a distributed computing system.

FIG. 5 is a schematic view illustrating an embodiment of a distributed computing system 500, which can be the HDFS 106 shown in FIG. 1. The system 500 in some implementations includes one or more processing units CPU(s) 502 (also referred to as hardware processors), one or more network interfaces 504, a memory 506, and one or more communication buses 508 for interconnecting these components. The communication buses 508 optionally include circuitry (sometimes called a chipset) that interconnects and controls communications between system components. The memory 506 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 506 optionally includes one or more storage devices remotely located from the CPU(s) 502. The memory 506, or alternatively the non-volatile memory device(s) within the memory 506, comprises a non-transitory computer readable storage medium. In some implementations, the memory 506 or alternatively the non-transitory computer readable storage medium stores the following programs, modules and data structures, or a subset thereof:
- an operating system 510, which includes procedures for handling various basic system services and for performing hardware dependent tasks;
- a network communication module (or instructions) 512 for connecting the system 500 with other devices (e.g., the user device 102 or the server under test system 108) via one or more network interfaces 504;
- a load generation module 132 for generating a plurality of computing tasks (e.g., authenticating a user based on a fingerprint, processing a payment from a user account, or verifying a user's identity based on past addresses) for execution based on a user-specified test program (e.g., a program that measures the performance and accuracy of a user identity verification server);
- a load distribution module 134 for distributing and adjusting the execution of a plurality of computing tasks among a number of execution servers (e.g., Hadoop name nodes); and
- data 514 stored on the system 500, which may include:
  - a test database 124 for storing and managing one or more test suites e.g., the test suites 516-A, 516-B, 516-C.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 506 optionally stores a subset of the modules and data structures identified above. Furthermore, the memory 506 may store additional modules and data structures not described above.

Figure 6:
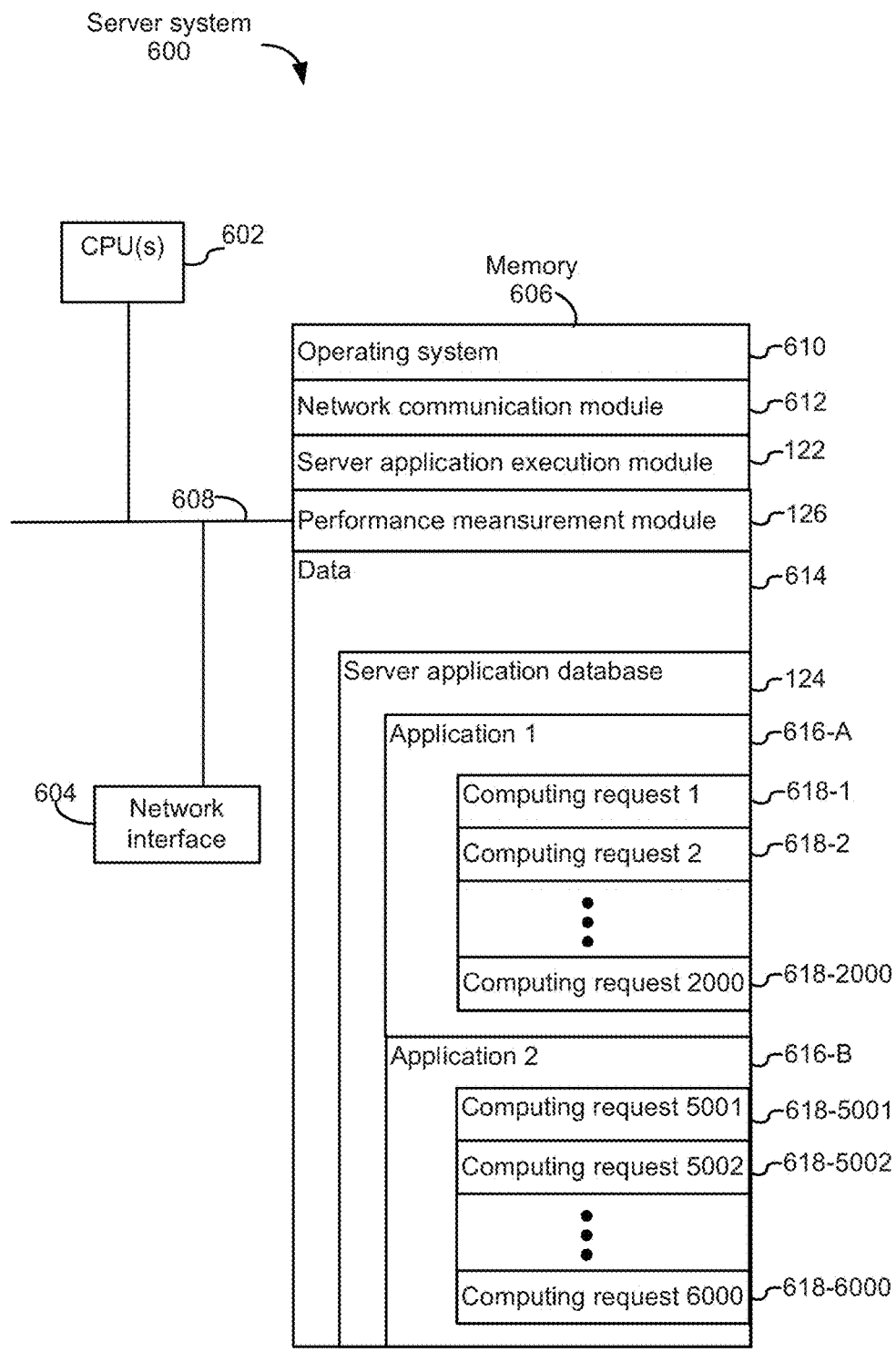
FIG. 6 is a schematic view illustrating an embodiment of a server system under test.

FIG. 6 is a schematic view illustrating an embodiment of a server system 600 under test, which can be the server under test 108 shown in FIG. 1. The system 600 in some implementations includes one or more processing units CPU(s) 602 (also referred to as hardware processors), one or more network interfaces 604, a memory 606, and one or more communication buses 608 for interconnecting these components. The communication buses 608 optionally include circuitry (sometimes called a chipset) that interconnects and controls communications between system components. The memory 606 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606, or alternatively the non-volatile memory device(s) within the memory 606, comprises a non-transitory computer readable storage medium. In some implementations, the memory 606 or alternatively the non-transitory computer readable storage medium stores the following programs, modules and data structures, or a subset thereof:

- an operating system 610, which includes procedures for handling various basic system services and for performing hardware dependent tasks;
- a network communication module (or instructions) 612 for connecting the system 600 with other devices (e.g., the user device 102 or the SQL system 106) via one or more network interfaces 604;
- a server application execution module 122 for executing one or more programs on the system 600 to respond to requested generated by computing tasks running on the HDFS;
- a performance measurement module 126 for tracking and measuring the performance of the system 600 when responding to computing requests generated by the HDFS 106; and
- data 614 stored on the system 600, which may include:
    - a server application database 124 for storing and managing one or more server side applications (e.g., a user identity verification program, a transaction authorization program, a risk assessment application, and a transaction query application) for responding to computing requests generated by the HDFS 106.

For example, as shown in FIG. 6, the server application 616-A has a total number of 2000 pending computing requests (e.g., 618-1, 618-2 . . . 618-2000); the server application 616-B has a total number of 1000 pending computing requests (e.g., 618-5001, 618-5002 . . . 618-6000).

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 606 optionally stores a subset of the modules and data structures identified above. Furthermore, the memory 606 may store additional modules and data structures not described above.

Although FIGS. 4, 6, and 6 show a "user device 400," an "HDFS 500," and a "server system," respectively, FIGS. 4, 5, and 6 are intended more as functional description of the various features which may be present in computer systems than as a structural schematic of the implementations described herein. In practice, and as recognized by those of ordinary skill in the art, items shown separately could be combined and some items could be separated.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
    selecting a user-specified test program for execution;
    determining one or more testing parameters associated with the user-specified test program, wherein the one or more parameters indicate a load to a server under test;
    identifying, based on the one or more testing parameters, computing nodes within a distributed computing system in a distributed testing environment;
    generating, based on the user-specified test program, a first plurality of computing tasks for execution by the computing nodes, wherein the first plurality of computing tasks when executed generate a second plurality of computing requests that simulate the load on the server under test;
    distributing execution of the first plurality of computing tasks across the computing nodes; and
    testing the load on the server under test that executes the second plurality of computing requests in a production environment-by causing the first plurality of computing tasks to be executed by the computing nodes in the distributed testing environment.

2. The method of claim 1, wherein the computing nodes include a name node and a plurality of data nodes managed by the name node.

3. The method of claim 2, wherein distributing the execution of the first plurality of computing tasks comprises:
    requesting the name node to distribute the execution of the plurality of computing tasks across the plurality of data nodes.

4. The method of claim 2, wherein the plurality of computing requests, when executed, request responses from a first server application; and wherein the method further comprises:
- detecting, using the name node, that the first server application is unresponsive; and
- responsive to the detecting, automatically re-starting, using the name node, the first server application.

5. The method of claim 2, wherein the plurality of computing requests, when executed, request responses from a first server application; and wherein the method further comprises:
- detecting, using the name node, that the first server application provides a response time longer than a predefined response time; and
- responsive to the detecting, automatically starting, using the name node, a second instance of the first server application.

6. The method of claim 5, further comprising:
- terminating an original instance of the first server application; and
- measuring a response time of the second instance of the first server application.

7. The method of claim 6, further comprising:
- continuing the original instance of the first server application; and
- determining a second response time of the first server application based on the response time of the original instance and a response time of the second instance.

8. The method of claim 1, further comprising:
- determining a performance indicator to be measured; and
- generating the first plurality of computing tasks to provide a predefined number of computing requests.

9. The method of claim 1, wherein causing the first plurality of computing tasks to be executed by the computing nodes comprises: causing the first plurality of computing tasks to be executed in a batch processing by the computing nodes.

10. The method of claim 1, wherein the second plurality of computing requests comprises two or more types of computing tasks.

11. A system, comprising:
- a non-transitory memory; and
- one or more hardware processors coupled to the non-transitory memory and configured to execute instructions to perform operations comprising:
  - selecting a user-specified test program for execution to test a load on a server under test;
  - determining one or more testing parameters associated with the user-specified test program;
  - identifying, based on the one or more testing parameters, computing nodes within a distributed computing system used for testing a server under test;
  - distributing execution of the user-specified test program across the computing nodes; and
  - testing the load on the server under test using output generated by the user-specified test program by causing the user-specified test program to be executed by the computing nodes in the distributed computing system.

12. The system of claim 11, wherein the operations further comprise:
- measuring performance of the server under test based on execution of the user-specified test program by the computing nodes.

13. The system of claim 11, wherein testing the server under test further comprises:
- generating a predefined number of instances of the user-specified test program; and
- causing the predefined number of instances of the user-specified test program to be executed by the computing nodes.

14. The system of claim 11, wherein testing the server under test further comprises: causing the user-specified test program to be executed as part of a batch process job by the computing nodes.

15. The system of claim 11, wherein the computing nodes include a name node and a plurality of data nodes managed by the name node.

16. The system of claim 15, wherein distributing execution of the user-specified test program across the computing nodes comprises: requesting the name node to distribute the execution of a plurality of instances of the user-specified test program across the plurality of data nodes.

17. The system of claim 11, wherein the distributed computing system includes a Hadoop distributed file system.

18. A non-transitory machine-readable medium having stored thereon machine-readable instructions executable to cause a machine to perform operations comprising:
- selecting a user-specified test program for execution to test a load on a server under test;
- determining one or more testing parameters associated with the user-specified test program;
- identifying, based on the one or more testing parameters, computing nodes within a distributed computing system used for testing a server under test;
- distributing execution of the user-specified test program across the computing nodes; and
- testing the load on the server under test using output generated by the user-specified test program by causing the user-specified test program to be executed by the computing nodes in the distributed computing system.

19. The non-transitory machine-readable medium of claim 18, wherein the computing nodes include a name node and a plurality of data nodes managed by the name node.

20. The non-transitory machine-readable medium of claim 19, wherein distributing execution of the user-specified test program across the computing nodes comprises: requesting the name node to distribute the execution of a plurality of instances of the user-specified test program across the plurality of data nodes.

* * * * *